(12) United States Patent
Yamada

(10) Patent No.: US 6,329,993 B1
(45) Date of Patent: Dec. 11, 2001

(54) CHARACTER PROCESSING APPARATUS, CHARACTER PROCESSING METHOD AND RECORD MEDIUM RECORDING CHARACTER PROCESSING PROGRAM

(75) Inventor: Masao Yamada, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/220,593

(22) Filed: Dec. 28, 1998

(30) Foreign Application Priority Data

Jan. 19, 1998 (JP) .................................................. 10-007988

(51) Int. Cl.[7] .................................................. G06T 11/00
(52) U.S. Cl. .............................................................. 345/467
(58) Field of Search ................................... 345/141, 154, 345/467

(56) References Cited

U.S. PATENT DOCUMENTS

| | | | |
|---|---|---|---|
| 5,099,435 | * 3/1992 | Collins et al. | 345/150 |
| 5,959,635 | * 9/1999 | Watanabe et al. | 345/469 |
| 6,016,155 | * 1/2000 | Hiraike | 345/468 |
| 6,061,070 | * 5/2000 | Sugaya | 345/467 |

FOREIGN PATENT DOCUMENTS

| | | |
|---|---|---|
| 54-053835A | * 4/1979 | (JP) . |
| A-7-44539 | 2/1995 | (JP) . |

\* cited by examiner

*Primary Examiner*—Jeffery Brier
*Assistant Examiner*—Motilewa Good-Johnson
(74) *Attorney, Agent, or Firm*—Oliff & Berridge, PLC

(57) ABSTRACT

To enable the speedup of processing for generating a document image and the reduction of an area for storing a character pattern without using processing requiring time if a character is output, a pattern format selecting section 106 for selecting a pattern format based upon the character data of a character to be output, a pattern generating section 107 which can generate a character pattern in plural pattern formats for generating a character pattern in the pattern format selected by the pattern format selecting section 106 based upon the character data of the character to be output, a pattern storing section 112 for storing the generated character pattern together with format information showing pattern format thereof and a pattern converting section 115 for converting the stored character pattern corresponding to the format information to a character pattern in a format required in the generation of a document image if the stored format information shows that the format is a format requiring conversion in the generation of the document image are provided.

10 Claims, 4 Drawing Sheets

|  | DOCUMENT DATA | DOCUMENT IMAGE GENERATION INFORMATION |
|---|---|---|
| FIRST LINE | SD | INITIALIZING DOCUMENT IMAGE |
| SECOND LINE | SS 20P | |
| THIRD LINE | CS あ | PASTING PATTERN WITH CONTROL NUMBER 1 |
| FOURTH LINE | SS 11P | |
| FIFTH LINE | CS あ | PASTING PATTERN WITH CONTROL NUMBER 2 |
| SIXTH LINE | SP | GENERATING DOCUMENT IMAGE |

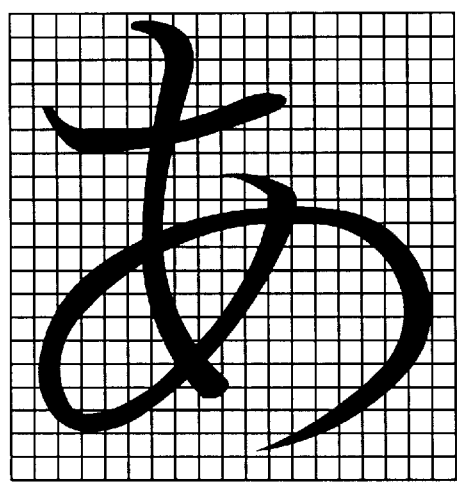
BIT MAP FORMAT
Fig. 5A
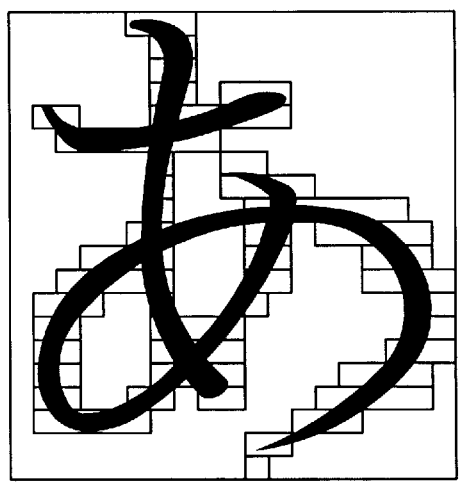
EDGE LIST FORMAT
Fig. 5B
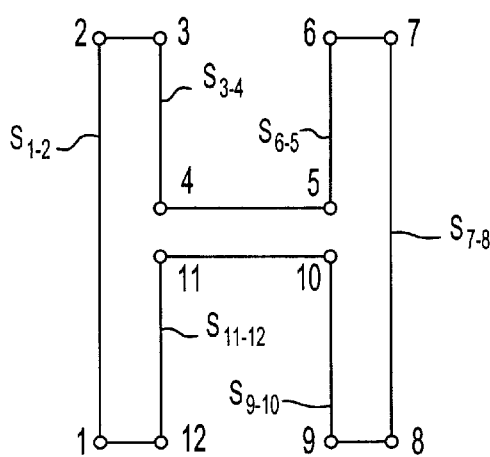
OUTLINE
Fig. 6A
Moveto 1
Lineto 2
Lineto 3
Lineto 4
Lineto 5
Lineto 6
Lineto 7
Lineto 8
Lineto 9
Lineto 10
Lineto 11
Lineto 12
ClosePath
CHARACTER DATA
Fig. 6B

CHARACTER PROCESSING APPARATUS, CHARACTER PROCESSING METHOD AND RECORD MEDIUM RECORDING CHARACTER PROCESSING PROGRAM

BACKGROUND OF THE INVENTION

The present invention relates to a character processing apparatus and a character processing method respectively for generating the output pattern of a character if the character specified by a character code is output for example and a record medium recording a character processing program for instructing a computer to execute the processing of the character.

Heretofore, a character processing apparatus which 9generates a pattern of two-dimensional arrangement in a document image based upon character data showing outline thereof if the document image composed of a character including a mark and others is output to an output device such as a printer and a display is known. Such a character processing apparatus extracts character data specified by a character code of a character to be output from stored location thereof, generates a pattern in a format such as a bit map according to the resolution of an output device and temporarily stores the generated pattern in a storage area to use it when a document image is generated (synthesized).

The more patterns are stored in a storage area, the more processing speed when a document image is generated is enhanced. However, a storage area is limited though the size of the storage area differs depending upon the configuration of an individual processing apparatus and others. Thus, to store more patterns in a storage area, a generated pattern is compressed.

However, as processing for expanding a compressed pattern is required to obtain a desired pattern when a document image is generated though many generated patterns can be stored in a storage area according to a method for compressing and storing a pattern, there is a case that processing speed when a document image is generated is not greatly enhanced as a result.

As one of techniques for solving such processing speed, technique disclosed in the Unexamined Japanese Patent Application Publication No. Hei 7-44539 can be given. To explain the technique, first, when a generated pattern is stored, a pattern frequently used in a generated document image is not compressed, while a pattern seldom used is compressed and second, when a document image is generated, expanding processing is executed only if a desired pattern is compressed. Hereby, many patterns can be stored in a storage area and when a document image is generated, time required for extracting a desired pattern is reduced.

However, according to such prior art, for a frequently-used character pattern, though it can be processed at high speed, it requires a large storage area because it is not compressed. In the meantime, for a character pattern seldom used, though it does not require a large storage area, compression processing is required when the pattern is stored and further, expansion processing is required when a document image is generated.

Therefore, in view of processing from the generation of a pattern to the generation of a document image, it is conceivable that the improvement of processing speed, the reduction of an occupied storage area and others cannot be expected so much.

SUMMARY OF THE INVENTION

The present invention is made in view of the above problems and the object is to provide a character processing apparatus and a character processing method wherein if a character specified by a character code is output, processing requiring time such as compression/expression processing is not required and further, the speedup of the whole processing from the generation of a pattern to the generation of a document image and the reduction of a storage area occupied by a character pattern are enabled, and a record medium recording a character processing program for instructing a computer to execute character processing thereof.

To achieve the above object, according to the present invention, pattern format selecting means for selecting a pattern format based upon the data of a character to be output, pattern generating means enabling the generation of a character pattern in plural pattern formats for generating a character pattern based upon the data of the character to be output in the pattern format selected by the above pattern format selecting means, pattern storing means for storing the character pattern generated by the above pattern generating means together with format information showing the pattern format and conversion means for converting the character pattern corresponding to the above format information and stored in the above pattern storing means to a format required in the generation of an image if the format information shows that the format is a format required to be converted are provided.

According to the present invention, a character pattern is generated and stored in a pattern format selected based upon the data of a character to be output, while if the character pattern is in a format requiring conversion, the character pattern is converted to a format required in the generation of a document image.

For a criterion of selecting a pattern format to use for generation, the output size of a character to be output is conceivable. The reason is that a storage area required to store a pattern differs depending upon the size of a character. For example, in the case of a bit map format, a larger storage area is required in proportion to the square of size, however, in the case of the other pattern formats such as an edge list format, a large storage area is not required, compared with the bit map format. Therefore, when a character pattern is generated in a bit map format if size thereof is small and in a another pattern format if the size is large, a storage area can be reduced.

Also, at this time, if threshold-line size information is beforehand added to character data and a pattern format is selected based upon whether output size exceeds size information or nor, a desirable result is obtained.

Further, if an area in which a character pattern is stored is estimated and as a result of the estimate, a pattern format the storage area of which is the smallest is selected, a desirable result is further obtained. A case that the above estimate is made every character data one by one before a character pattern is generated and a case that the above estimate is collectively made for character data to some extent are conceivable.

BRIEF DESCRIPTION OF THE DRAWINGS

FIG. 5A explains the concept of a bit map format, and FIG. 5B explains the concept of an edge list format; and FIG. 6A is an example showing the outline of a character defined by endpoints and segments, and FIG. 6B shows character data thereof.

DETAILED DESCRIPTION OF THE PREFERRED EMBODIMENTS

Figure 1:
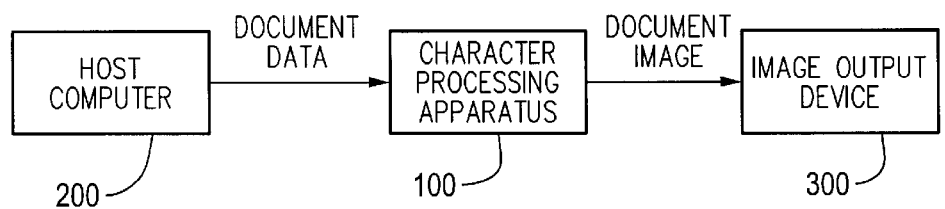
FIG. 1 is a block diagram showing the configuration of the whole system including a character processing apparatus equivalent to an embodiment of the present invention.

Referring to the drawings, embodiments of the present invention will be described below.

(First Embodiment)

First, a character processing apparatus equivalent to a first embodiment of the present invention will be described.

FIG. 1 is a block diagram showing the configuration of the whole system including a character processing apparatus 100 equivalent to the first embodiment of the present invention. As shown in FIG. 1, a host computer 200 instructs a document image to be output by outputting document data to be the document image as code image data such as picture description language (PDL). The character processing apparatus 100 interprets document data as code image data and generates a rasterized document image (data).

An image output device 300 outputs an image according to a document image, and a printer, a display and others are equivalent to this.

FIG. 1 shows each block in the system separately for convenience of explanation. That is, actually, the character processing apparatus 100 may generate a document image based upon document data as one function of the host computer 200 and may generate a document image as one function of the image output device 300.

If the character processing apparatus 100 operates as one function of the host computer 200, the host computer 200 generates and outputs a document image based upon document data by executing equal operation described later to the character processing apparatus in a predetermined program. In the meantime, if the character processing apparatus operates as one function of the image output device 300 as the latter, the image output device 300 generates a document image based upon document data similarly by executing equal operation to the character processing apparatus and outputs an image based upon the document image.

In any case, how to connect each block is not asked. That is, each block may be also connected via a network or may be also directly connected via a cable.

Further, the character processing apparatus 100 operates as one function of an image processing apparatus which also processes data such as a line including a ruled line, a polygon, a circle, a straight line, a curve and others, a picture and a pattern. Therefore, actually, processing related to a line, a picture, a pattern and others is also executed in parallel in addition to a character.

Figure 2:
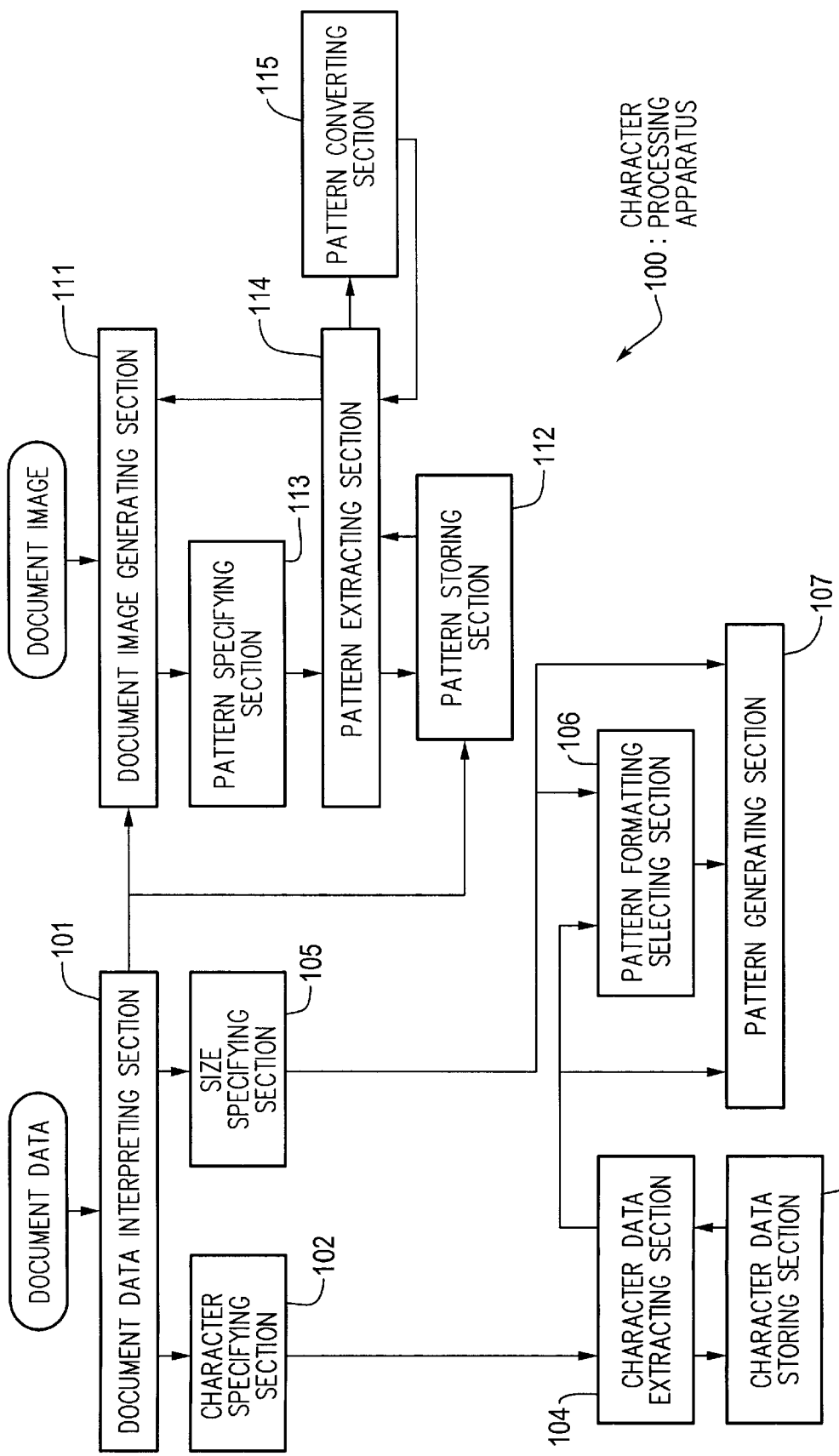
FIG. 2 is a block diagram showing the configuration of the character processing apparatus.

Next, the detailed configuration of the character processing apparatus 100 will be described. FIG. 2 is a block diagram showing the configuration. Document data shown in FIG. 2 is received from the host computer 200. A document data interpreting section 101 interprets document data and extracts an instruction to plot a character. At this time, the document data interpreting section 101 also outputs a control number showing the order of processing.

A character specifying section 102 specifies a character to be output in terms of a character code based upon the instruction to plot the character extracted by the document data interpreting section 101. For a character code, various character codes such as a JIS code, a shifted JIS code, a punctuation mark and Unicode may be used.

In the meantime, a character data storing section 103 beforehand stores the character data of a character to be output every character as an aggregate of endpoints defining the outline of the character. Selection information to be a threshold when the pattern format of character data is selected and showing the size of a character is added to character data stored in the character data storing section 103.

A character data extracting section 104 extracts character data corresponding to a character code specified by the character specifying section 102 from the character data storing section 103.

A size specifying section 105 specifies the size of a character to be output based upon the number of points for example based upon the instruction to plot the character extracted by the document data interpreting section 101.

Next, a pattern format selecting section 106 selects a pattern format not requiring conversion when a document image is generated if the size of the character to be output specified by the size specifying section 105 is smaller than size shown in selection information added to the character data of the character, while if not, the above pattern format selecting section selects a pattern format the processing time required for the generation and conversion of which is shorter than that of compression/expansion processing though the selected pattern format is a pattern format requiring conversion when a document image is generated. In this embodiment, in the case of the former, such a pattern format is a bit map format, while in the case of the latter, such a pattern format is an edge list format.

A pattern generating section 107 can generate a character pattern based upon character data extracted from the character data storing section 103 in plural formats and generates a character pattern according to a pattern format selected by the pattern format selecting section 106.

To explain the bit map format, as shown in FIG. 4A, as a character is constituted by a dot pattern in two-dimensional arrangement, conversion is not required when a document image is generated.

In the meantime, to explain the edge list format, as shown in FIG. 4B, as a character is represented by the starting point of dots constituting a character and the number of dots continuous in the direction of the x-axis from the starting point, conversion to the bit map format is required when a document image is generated. However, as the generation of the edge list format and conversion from the edge list format to the bit map format can be processed only by simple algorithm, they can be processed in a shorter time than compressing or expanding a character pattern.

For an area required for storage in these pattern formats, in the case of the bit map format, the area is increased in proportion to the square of the size of a character pattern, while in the case of the edge list format, the area is increased in proportion to the number of segments changing in the direction of the y-axis of segments one of which defines the outline of a character and one of which means a line defined by endpoints including a starting point and an end point because the number of dots continuous from the starting point in the direction of the x-axis is required.

Therefore, if a character pattern is small, a storage area in the bit map format is smaller, however, when the size of a character pattern excesses certain size, a storage area in the edge list format is conversely smaller.

As the number of segments changing in the direction of the y-axis differs every character, size in which the size of a storage area is reversed also differs every character. Therefore, in this embodiment, size in which the size of a storage area required in the bit map format is larger than that of the edge list format is added to each character data as selection information.

FIG. 2 will be described again below. A document image generating section 111 generates a document image in order according to a control number output by the document data interpreting section 101 and supplies it to the image output device 300. Hereby, the image output device 300 actually outputs the generated document image.

In the meantime, a pattern storing section 112 stores a character pattern which is generated by the pattern generating section 107 and to which the control number output by the document data interpreting section 101 is added together with information showing pattern format thereof.

A pattern specifying section 113 instructs a character pattern in a control number specified by the document image generating section 111 to be extracted from the pattern storing section 112.

A pattern extracting section 114 first extracts a character pattern in a control number specified by the pattern specifying section 113 and information showing pattern format thereof from the pattern storing section 112 and second outputs a character pattern corresponding to the information to a pattern converting section 115 if the extracted information showing pattern format thereof shows the edge list format.

Figures 3, 4:
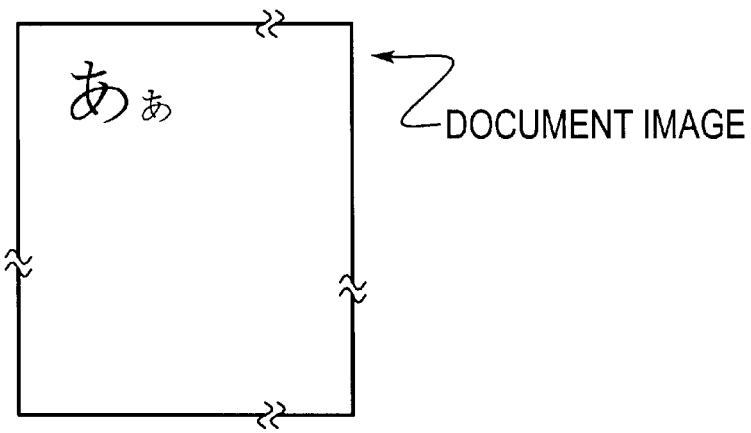
FIG. 3 shows an example of a document image generated by the character processing apparatus.
FIG. 4 shows document data when the document image is generated.

The pattern converting section 115 converts the character pattern in the edge list format to a character pattern in the bit map format and returns the character pattern to the pattern extracting section 114. Next, the operation of the character processing apparatus equivalent to this embodiment will be described, giving a case that a document shown in FIG. 3 is generated as an example. This document is composed of a Japanese hiragana character equivalent to "a" in an alphabet and shown in 20 point and the same character next shown in 11 point. To simplify description, suppose that the resolution of an output device is 72 dots per inch (dpi), a dot map format is adopted and size shown in the selection information of the above character is 15×15 dot size.

If the document shown in FIG. 3 is generated, document data thereof is as shown in FIG. 4. "SD" of data shown in FIG. 4 denotes an instruction for instructing the start of the document, "SS m" denotes an instruction for specifying size to be output in terms of an argument m, "CS n" denotes an instruction for specifying a character to be output in terms of an argument n and "SP" denotes an instruction for instructing the generation of a document image. For convenience of explanation, the above argument n is represented as the above Japanese hiragana character, however, actually, the argument n is a character code corresponding to a character.

First, the SD instruction on a first line in the document data is interpreted by the document data interpreting section 101. Hereby, first, a document image is initialized, second, the pattern storing section 112 is initialized, third, a control number is initialized to '1', fourth, document generation information is generated and sent to the document image generating section 111.

Next, the SS instruction on a second line is interpreted and the information of 20 point as the specified size is sent to the size specifying section 105. Hereby, the size specifying section 105 instructs a character to be output in 20 point.

Further, the CS instruction on a third line is interpreted by the document data interpreting section 101 and the character code of the above specified Japanese hiragana character is sent to the character specifying section 102. Hereby, the character specifying section 102 instructs the above character to be output. As document generation information, information for instructing a pattern with a control number 1 to be pasted is sent to the document image generating section 111.

When the output of these characters is instructed, the character data of the above Japanese hiragana character and selection information thereof are extracted by the character data extracting section 104, the former is supplied to the pattern generating section 107 and the latter is supplied to the pattern format selecting section 106.

As one point is equivalent to approximately $\frac{1}{72}$ inch and the resolution of output in this embodiment is 72 dpi, 20 point is size equivalent to 20×20 dots.

Therefore, as 20 point which is the size of a character to be first output is larger than 15×15 dots shown in the selection information of the above Japanese hiragana character, the edge list format is selected by the pattern format selecting section 106 as a pattern format.

By the above selection, a character pattern is generated in the size of 20×20 dots in the edge list format based upon the character data of the above Japanese hiragana character extracted by the character data extracted section 104 by the pattern generating section 107, further, the character pattern and information showing the character pattern is generated in the edge list format are related, a control number 1 is allocated and stored in the pattern storing section 112.

Next, the SS instruction on a fourth line and the CS instruction on a fifth line are also similarly processed to the instructions on the second line and on the third line.

However, as 11 point which is the size of a character to be second output is size equivalent to 11×11 dots and is smaller than 15×15 dots showing in selection information thereof, the bit map format is selected as a pattern format.

Therefore, the character pattern of the second Japanese hiragana character is generated in the bit map format of 8×8 dots, a control number 2 is allocated to the character pattern and stored together with information showing the character pattern is generated in the bit map format.

The SP instruction on a sixth line is interpreted by the document data interpreting section 101. Hereby, as the generation of the document image is first instructed, processing according to document image generation information sent ranging from the initialization of the document image to the generation of the document image from the document data interpreting section 101 is sequentially executed by the document image generating section 111. The details are as follows:

First, the character image generating section 111 instructs the pattern specifying section 113 to extract a character pattern corresponding to control number 1 thereof. By the above instruction, the character pattern with the control number 1 and information showing pattern format thereof are extracted from the pattern storing section 112 by the pattern extracting section 114.

As the information showing the pattern format of the character pattern with the control number 1 shows that the character pattern is generated in the edge list format, the pattern extracting section 114 outputs the character pattern to the pattern converting section 115.

Hereby, after the character pattern is converted to a character pattern in the bit map format by the pattern converting section 115, it is supplied to the document image generating section 111 via the pattern extracting section 114.

The character pattern with the control number 1 converted to the character pattern in the bit map format is pasted in a predetermined position by the document image generating section 111. The above pasting actually means that a character pattern in the bit map format is written to an address corresponding to a position to be plotted on a page in a page buffer provided with an area corresponding to the resolution of an output device.

Similarly, the document image generating section 111 instructs a character pattern corresponding to a control number 2 to be extracted. By the instruction, the character pattern with the control number 2 and information showing pattern format thereof are extracted.

As the information showing the pattern format of the character pattern with the control number 2 shows that the character pattern is generated in the bit map format, the character pattern is supplied to the document image generating section 111 as it is.

The character pattern with the control number 2 in the bit map format is pasted in a position next to the control number 1 by the document image generating section 111.

By the above processing, the document image shown in FIG. 3 is generated and is actually output by the image output device 300.

As described above, according to the character processing apparatus equivalent to the first embodiment, as the pattern format selecting section 106 selects a pattern format the storage area of which is smaller of the bit map format and the edge list format and the pattern generating section 107 generates a character pattern in the selected pattern format, a storage area required when a document image is generated can be reduced and further, the generation of a document image can be speeded up, compared with compression/expansion processing.

In the first embodiment, no typeface is considered to simplify explanation, however, it is natural that a typeface may be considered. If a typeface is considered, the character specifying section 102 also specifies the font of a character to be output in addition to the character code, while the character data storing section 103 stores the character data of the character to be output every font and further, the character data extracting section 104 extracts character data corresponding to the specified character code and font. Such specification of a font is enabled by adding an "SF r" instruction as document data and specifying the typeface of a character to be output in terms of the argument r.

(Second Embodiment)

Next, a character processing apparatus equivalent to a second embodiment of the present invention will be described.

The pattern format selecting section 106 in the first embodiment selects a pattern format depending upon whether the size of a character to be output is larger than the size of a character shown in selection information added to the character data or not. In the meantime, a pattern format selecting section 106 in the second embodiment scans character data, estimates the storage area of a character pattern in each pattern format and as a result, selects a pattern format in which the storage area of a character pattern is the smallest.

Therefore, the character processing apparatus equivalent to the second embodiment is different from the character processing apparatus equivalent to the first embodiment shown in FIG. 1 only in the operation of the pattern format selecting section 106 and has the same configuration as the character processing apparatus equivalent to the first embodiment. Therefore, the description of the configuration is omitted and only the criterion of judging a pattern format in the pattern format selecting section 106 will be described below.

For convenience of explanation, a pattern storing section 112 shall store and extract a character pattern in apparatus of 8 bits.

First, the size of an area for storing a character pattern in a bit map format for one character is obtained according to the following expression because the size depends upon the size of a character to be output as described above:

Size of storage area in bit map format={int (character patter lateral size/8)+1}× character pattern vertical size However, "lint" denotes a function for obtaining an integral part in quotient in division in the parenthesis.

In the meantime, the size of an area for storing a character pattern in an edge list format for one character depends upon the number of segments changing in the direction of the y-axis of segments defining the outline of a character as described above.

Therefore, the size of an area for storing a character pattern in the edge list format is obtained according to the following expression:

Size of storage area in edge list format= (number of segments in each of which y coordinates at starting point and end point are different/2)× size of cell of edge list× character pattern vertical size If a character to be output is "H", character data thereof is as shown in FIG. 6B for example. "Moveto m" in these denotes an instruction for setting an endpoint shown by an argument m as a current point. "Lineto n" denotes an instruction for plotting from a current point to an endpoint shown by an argument n as a straight line and setting the endpoint shown by the argument n as a current point. Further, "ClosePath" ok denotes an instruction for plotting from a current point to an endpoint shown by the argument m in "Moveto m" as a straight line.

Therefore, according to the character data shown in FIG. 6B, the endpoints and their segments are defined as shown in FIG. 6A and the outline of the character H is shown.

After the outline defined by the character data is actually enlarged/reduced in the form of a similar figure according to the size of a character to be output and further, is transformed according to a style (italics) if necessary, closed area thereof is painted out and used. The arguments n and m are actually data showing the position of an endpoint.

In the segments of the character H shown in FIG. 6A, segments changing in the direction of the y-axis are the following six. That is, a segment $S_{-2}$ defined by an endpoint 1 and an endpoint 2, a segment $S_{3-4}$ defined by an endpoint 3 and an endpoint 4, a segment $S_{5-6}$ defined by an endpoint 5 and an endpoint 6, a segment $S_{7-8}$ defined by an endpoint 7 and an endpoint 8, a segment $S_{9-10}$ defined by an endpoint 9 and an endpoint 10, and a segment $S_{11-12}$ defined by an endpoint 11 and an endpoint 12.

If a cell of an edge list is represented by the total 2 bytes of one byte at a starting point and one byte in length and the character pattern of the character H shown in FIG. 6A is generated in the size of 50 point, that is, in the size of 50×50 dots at the resolution of 72 dpi, each size of a storage area in the bit map format and in the edge list format is as follows:

Size of storage area in bit map format={int (50/8)+1}× 50=350 bytes

Size of storage area in edge list format=(6/2)×2 ×50=300 bytes

Therefore, the pattern format selecting section 106 selects the edge list format if the character pattern of the character H shown in FIG. 6A is generated in 50 point at the resolution of 72 dpi.

As described above, if character data is scanned, the storage area of a character pattern in each pattern format is estimated and a pattern format the storage area in which is smaller is selected, a used storage area in the pattern storing section 112 can be reduced.

For time when each pattern format is selected, a case that a pattern format is selected every character every time character data is supplied, a case that a pattern format for character data to some extent (for example, for one page or for all pages) in document data is collectively selected and others are conceivable. In the case of the latter, the pattern format selecting section 106 stores each character data and their pattern formats selected based upon an estimated result in a table for example, while the pattern generating section 107 obtains a pattern format corresponding to character data to be processed by referring to the above table and generates a character pattern according to the pattern format.

According to the character processing apparatus equivalent to the above second embodiment, the pattern storing section 112 can store more character patterns. In other words, a storage area required for storing a character pattern can be reduced. In addition, in the second embodiment, selection information is not required to be added every character data as in the first embodiment.

In the second embodiment, the size of a storage area in the edge list format is obtained based upon the number of segments changing in the direction of the y-axis, however, if the above number is to be obtained more precisely, it is desirable that overlap between segments is considered.

If a pattern format is not selected only by the size of a storage area but pattern generated time in each format, time required for pattern converting processing and others are considered, an area required for storing a character pattern can be reduced, time required for processing from the generation of a character pattern to the generation of a document image can be reduced and the efficiency of the processing can be also enhanced.

In addition, in the first and second embodiments, as an example of a pattern format requiring conversion when a document image is generated and shorter in processing time required for the generation and conversion than compression/expansion processing, the edge list format is used, however, needless to say, another pattern format may be also used.

Further, in the first and second embodiments, two types of the bit map format and the edge list format are provided as a pattern format, however, it is natural that three types or more may be provided.

As described above, according to the present invention, if a character specified by a character code is output, processing requiring time such as compression/expansion processing is not required and further, the speedup of processing for generating a document image and the reduction of an area for storing a character pattern are enabled.

What is claimed is:

1. A character processing apparatus, comprising:
   a pattern format selector that selects a pattern format based upon the data of a character to be output;
   a pattern generator that generates a character pattern in plural pattern formats to generate a character pattern in the pattern format selected by said pattern format selection based upon the data of the being output;
   a pattern storage medium that stores the character pattern generated by said pattern generation together with format information showing pattern format thereof including an estimation that estimates a storage area to store a character pattern format utilizing the smallest practicable storage area available; and
   a conversion device that converts the character pattern stored in said pattern storing and corresponding to format information thereof to a character pattern in a format required in generation of an image if said format information shows the format being a format requiring conversion.

2. The character processing apparatus according to claim 1, wherein:
   said pattern format selector selects a pattern format based upon the output size of a character to be output.

3. The character processing apparatus according to claim 2, wherein:
   said pattern format selector selects a pattern format based upon a result of comparison between the output size of a character being output and size information beforehand added to the data of the character being output.

4. The character processing apparatus according to claim 1, wherein:
   said pattern format selector estimates the storage area of a character pattern generated based upon the data of a character being output every pattern format and selects a pattern format based upon the estimated result.

5. The character processing apparatus according to claim 4, wherein:
   said pattern fomat selector selects a pattern format a storage area being smaller based upon said estimated result.

6. The character processing apparatus according to claim 4, wherein:
   said pattern format selector selects a pattern format every time the data of a character being output is supplied.

7. The character processing apparatus according to claim 4, wherein:
   said pattern format selector instructs to store the selected pattern format and character data thereof; and
   said pattern generator generates a character pattern in a pattern format stored corresponding to the following data based upon the data of a character being output.

8. The character processing apparatus according to claim 1, further comprising:
   an image generator that generates a character pattern corresponding to the format information and converted by said conversion device if said format information shows that the format is a format that requires conversion and in the meantime, that generates an image using the character pattern corresponding to the format information and stored by the said pattern storing if said format information shows that the format being a format not requiring conversion.

9. A character processing method, comprising:
   selecting a pattern format based upon the data of a character being output;
   generating a character pattern in the selected pattern format based upon the data of the character being output;
   storing the generated character pattern together with format information showing pattern format thereof including an estimation that estimates a storage area to store a character pattern format utilizing the smallest practicable storage area available; and
   converting the character pattern corresponding to the fomat information to a character pattern in a format required that generates an image if said format information shows that the format being a format requiring conversion.

10. A record medium recording a character processing program that instructs a computer to convert the data of a character being output to data in a format required that generates an image; wherein:

said character processing program instructs a computer comprising;

selecting a pattern format based upon the data of the character being output;

generating a character pattern in the selected pattern format based upon the data of the character being output;

storing the generated character pattern together with format information showing pattern format thereof including an estimation that estimates a storage area to store a character pattern format utilizing the smallest practicable storage area available; and converting the character pattern corresponding to the format information to a character pattern in a format required that generates an image if said format information shows the format being a format conversion.

* * * * *